US006766401B2

(12) United States Patent
Bonomo et al.

(10) Patent No.: US 6,766,401 B2
(45) Date of Patent: Jul. 20, 2004

(54) INCREASING CONTROL INFORMATION FROM A SINGLE GENERAL PURPOSE INPUT/OUTPUT (GPIO) MECHANISM

(75) Inventors: Ralph Bonomo, Port Ewen, NY (US); Daryl Carvis Cromer, Apex, NC (US); Howard Jeffrey Locker, Cary, NC (US); Joseph Michael Pennisi, Apex, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 09/844,178

(22) Filed: Apr. 27, 2001

(65) Prior Publication Data

US 2002/0161938 A1 Oct. 31, 2002

(51) Int. Cl.[7] .............................................. G06F 13/00
(52) U.S. Cl. ......................................... 710/301; 710/15
(58) Field of Search ................................. 710/104, 100, 710/300–304, 8–19; 713/1, 2, 100

(56) References Cited

U.S. PATENT DOCUMENTS

| 5,257,388 A | * | 10/1993 | Hayamizu ................... 711/115 |
| 5,280,202 A |   | 1/1994  | Chan et al. |
| 5,418,960 A |   | 5/1995  | Munroe |
| 5,428,752 A | * | 6/1995  | Goren et al. ................ 710/300 |
| 5,600,841 A |   | 2/1997  | Culbert |
| 5,708,819 A |   | 1/1998  | Dunnihoo |
| 5,796,639 A | * | 8/1998  | Hall ............................ 702/118 |
| 5,802,074 A | * | 9/1998  | Hall ............................ 714/734 |
| 5,809,555 A |   | 9/1998  | Hobson |
| 5,835,931 A | * | 11/1998 | Brandt et al. .................. 711/5 |
| 5,854,908 A |   | 12/1998 | Ogilvie et al. |
| 5,892,973 A | * | 4/1999  | Martinez et al. .............. 710/15 |
| 5,948,077 A | * | 9/1999  | Choi et al. ..................... 710/9 |
| 5,983,288 A | * | 11/1999 | Visee ........................... 710/16 |
| 6,000,040 A |   | 12/1999 | Culley et al. |
| 6,038,629 A |   | 3/2000  | Ogilvie et al. |
| 6,052,742 A | * | 4/2000  | Kirinaka et al. .............. 710/10 |
| 6,138,182 A | * | 10/2000 | Hennessy et al. ............. 710/16 |
| 6,188,189 B1 | * | 2/2001  | Blake .......................... 318/471 |
| 6,308,240 B1 | * | 10/2001 | De Nicolo ................... 710/300 |
| 6,340,969 B1 | * | 1/2002  | Lin ............................. 345/211 |
| 6,498,759 B2 | * | 12/2002 | Chang et al. ............... 365/226 |
| 6,559,783 B1 | * | 5/2003  | Stoneking ................... 341/141 |
| 6,564,278 B1 | * | 5/2003  | Olson ......................... 710/301 |
| 6,606,670 B1 | * | 8/2003  | Stoneking et al. ............ 710/14 |
| 2002/0099878 A1 | * | 7/2002 | Henrie et al. ................. 710/14 |
| 2003/0005274 A1 | * | 1/2003 | Bresemann et al. ........... 713/1 |

* cited by examiner

Primary Examiner—Sumati Lefkowitz
(74) Attorney, Agent, or Firm—Sawyer Law Group, LLP; Carlos Nunoz-Bustamante

(57) ABSTRACT

Aspects for increasing control information from a single general purpose input/output (GPIO) mechanism are described. The aspects include establishing a plurality of voltage levels to indicate a plurality of states for association with installed options on a computer system planar. Further included is the determination of which of the installed options is present via the single GPIO. An analog-to-digital (A/D) converter is also included and converts a voltage level signal indicative of installed options on the computer system planar, while a resistor network is utilized to establish the plurality of voltage levels.

17 Claims, 2 Drawing Sheets

INCREASING CONTROL INFORMATION FROM A SINGLE GENERAL PURPOSE INPUT/OUTPUT (GPIO) MECHANISM

FIELD OF THE INVENTION

The present invention relates to general purpose input/output mechanisms (GPIOs), and more particularly to increasing control information from a single GPIO.

BACKGROUND OF THE INVENTION

A trend emerging in computer system development and manufacturing involves a move toward a building block-based approach, where a system is created by a collection of building blocks. This approach places increasing need on the ability to detect, enable/disable, and customize building blocks to create the desired personality of the system.

The flexibility of varying the system configuration through building blocks requires that the POST (power-on self test) of the planar be able to detect, enable/disable, and configure the various options installed. This is frequently handled with the use of General Purpose Input Outputs (GPIOs). Typically, a GPIO can only detect two states (high/low) and is dedicated to a function or a particular device. For example, if a particular card is installed, the GPIO may detect a low state, while if the card is not installed, the GPIO may detect a high state.

The push to a building block model is rapidly increasing the need for GPIOs to assist in the detection of the building blocks installed. However, some systems have to limit the number of GPIOs due to other design considerations. Thus, a need exists for a manner of increasing the amount of control information from GPIOs without increasing the number of GPIOs.

The present invention addresses such a need.

SUMMARY OF THE INVENTION

Aspects for increasing control information from a single general purpose input/output (GPIO) mechanism are described. The aspects include establishing a plurality of voltage levels to indicate a plurality of states for association with installed options on a computer system planar. Further included is the determination of which of the installed options is present via the single GPIO.

Through the present invention, an increase in the amount of control/information that is available using GPIOs is achieved in a straightforward and effective manner without increasing the number of GPIOs. With the simple addition of parallel arrangement of resistors in a resistor network and efficient utilization of an unused A/D already present in the system, multiple states can be detected via the single GPIO. These and other advantages of the aspects of the present invention will be more fully understood in conjunction with the following detailed description and accompanying drawings.

DETAILED DESCRIPTION

The present invention relates to increasing control information of single GPIOs. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1A:
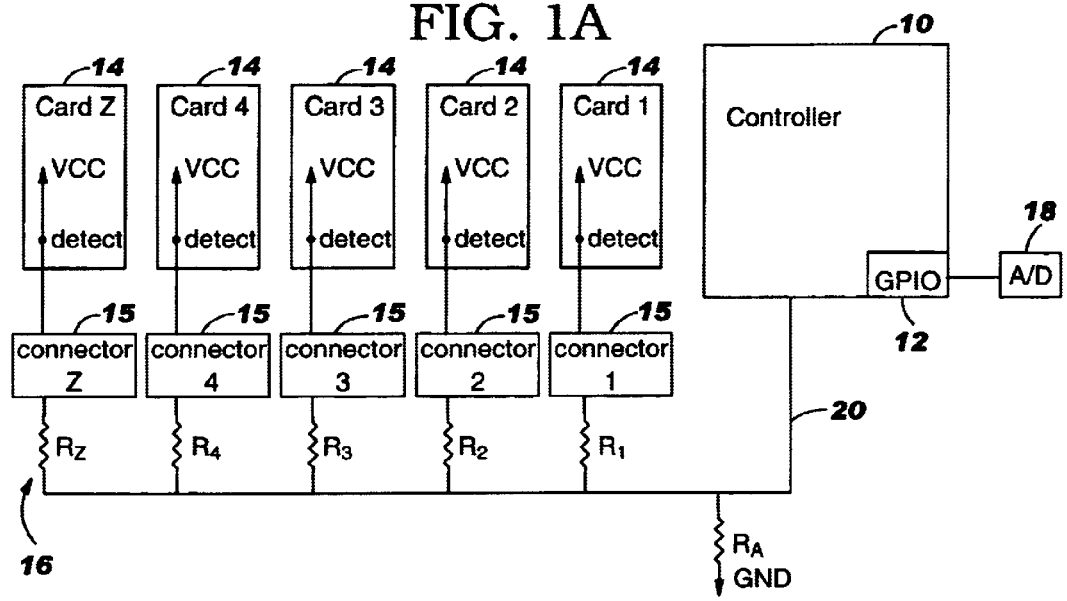
FIGS. 1A and 1B illustrate block diagrams of a portion of a computer system planar with a GPIO in accordance with the present invention.

Referring now to FIG. 1A, a block diagram of a portion of a planar is illustrated and includes a controller 10 which contains a GPIO 12. The GPIO 12 is coupled to detect one or more cards 14 via connectors 15. As an exemplary embodiment of the functionality of the present invention, suppose the planar supports multiple different daughter cards 14, e.g., daughter card 1, daughter card 2, daughter card 3, daughter card 4, where each daughter card contains the same chips with minor changes in discrete logic. Thus, the POST needs to know the status of card installation, i.e., which of the daughter cards is installed, or if no card is installed.

Under traditional operations, GPIOs follow Boolean logic (e.g., 0-low, 1-high) which allows for two states (True/False). Thus, the ability to detect multiple card states, i.e., whether a first card, a second card, a third card, a fourth card, or no card is installed, would require four GPIOs. A first GPIO, e.g., GPIO1, would be connected to a detect pin on daughter card 1, with the installed daughter card 1 grounding the detect pin. A second GPIO, e.g., GPIO2, would be connected to a detect pin on daughter card 2, with the installed daughter card 2 grounding that detect pin. A third GPIO, e.g., GPIO3, would be connected to a detect pin on daughter card 3, with the installed daughter card 3 grounding its detect pin. A fourth GPIO, e.g., GPIO4, would be connected to a detect pin on daughter card 4, with the installed daughter card 4 grounding that detect pin. When a POST routine of a controller reads the GPIOs, a low for GPIO1 indicates that the first card is installed, a low for GPIO2 indicates that the second card is installed, a low for GPIO3 indicates that the third card is installed, a low for GPIO4 indicates that the fourth card is installed, and a high for GPIO1, GPIO2, GPIO3, and GPIO4 indicates that no card is installed.

In contrast to the traditional operation requiring the use of separate GPIOs for detection of separate states, in accordance with the present invention, a single GPIO is used in conjunction with a resistor network structure 16 and an analog-to-digital (A/D) decoder 18 to detect multiple, separate states. As shown in FIG. 1A, the resistor network 16 includes a plurality of resistors, R1, R2, R3, through Rz, coupled in parallel to a voltage signal sense line 20. The number of resistors included in the resistor network 16 is dependent upon design needs, particularly the number of states desired to be sensed via the GPIO 12, as described in more detail with reference to FIG. 2. For the A/D 18 utilized with the GPIO 12 and resistor network 16 in the identification of multiple states with the single GPIO 12, an unused A/D converter within the system, such as an unused A/D converter of an environmental monitoring chip (e.g., manufactured chips part number LM79, LM80, ADM1024, as is well understood in the art), is suitable for detecting a voltage value that can indicate the status of the device presence via the GPIO 12.

Figure 1B:
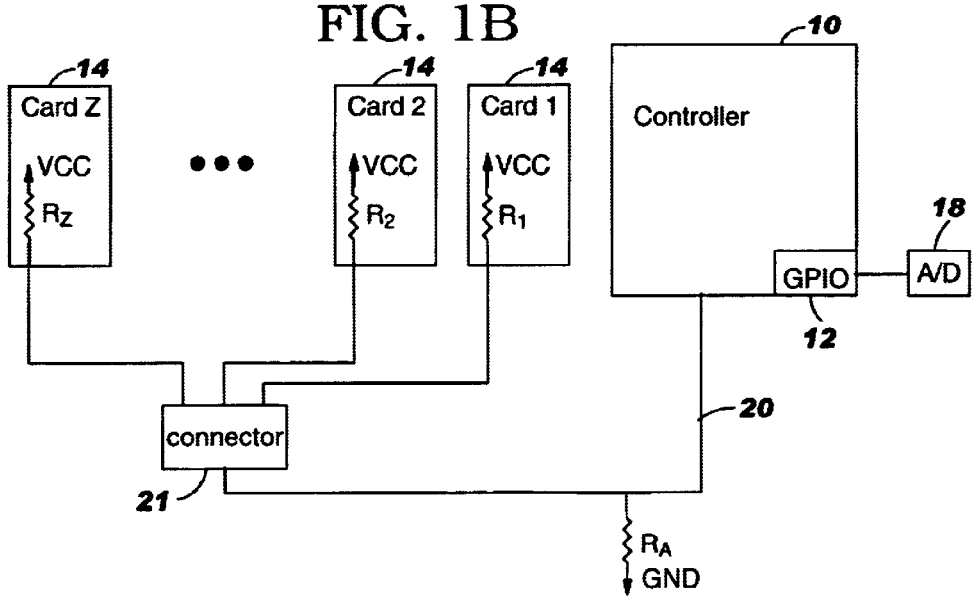

In a further embodiment, which card is installed in a slot can be determined without requiring the complexity of configuration registers. As illustrated on FIG. 1B, a card 1-Z (14) can be inserted into a connector 21. Since each daughter card 14 has a unique register value (R card), it forces the valve of the voltage on the sense line 20 via the parallel network Rcard/Ra.

Figure 2:
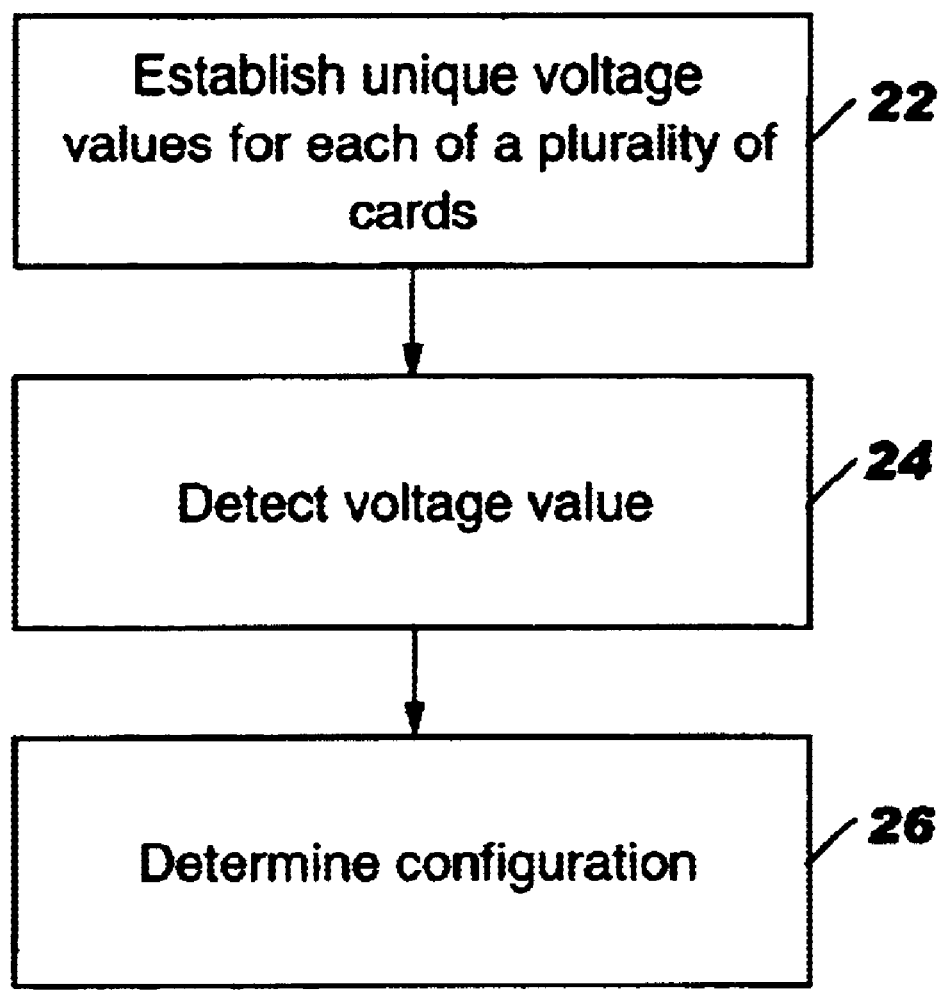
FIG. 2 illustrates a block flow diagram of a method that achieves the ability to increase the control information provided by a single GPIO in accordance with the present invention.

FIG. 2 illustrates a flow chart of a method that achieves the ability to increase the control information provided by a single GPIO in accordance with the present invention. The process includes establishing unique voltage values for each of a plurality of cards that are being detected via the GPIO 12 (step 22). As is well understood in the art, the establishing of unique voltage values results from the circuit of the parallel resistors of the resistor network 16. Thus, the resistance values are chosen as desired to achieve the voltage signals needed for given system requirements. Preferably, the resistance values chosen allow a unique voltage level to be clearly detectable depending upon which card(s) are present in the system. By way of example, when the presence of four daughter cards is being determined, unique voltage levels of 1 V (volt), 3 V, 5 V, and 7 V may be chosen to represent presence of first, second, third, or fourth daughter cards, respectively.

With the desired unique voltage levels established, the detection of the voltage level signal can commence (step 24). The voltage level signal preferably refers to the voltage from voltage signal sense line 20 being sensed by GPIO 12 that is converted to a digital signal via A/D 18. The converted voltage level determines the card configuration (step 26) when reading from the A/D 18 during a POST routine of controller 10. The signal read indicates which of the card(s) is present. By way of example, when no card is present, the signal indicates a ground voltage, since the voltage signal sense line 20 is tied to ground (GND) via resistor Ra. When any one of the cards is present, the signal level indicates the voltage level associated with that card (e.g., 1V, 3V, 5V, or 7V).

This method can also be used to detect how many devices are installed (such as memory SIMMs, I/O backplanes, etc.), since the unique voltage levels also allow for unique sums. Thus, using the example presented above, if the voltage is 1 V, card 1 only is installed. If the voltage is 3 V, card 2 only is installed. If the voltage is 5V, card 3 only is installed. If the voltage is 7 V, card 4 only is installed. If the voltage is 0.83 V, cards 1 and 3 are installed. If the voltage if 0.88 V, cards 1 and 4 are installed. If the voltage is 1.88V, cards 2 and 3 are installed. If the voltage is 2.1 V, cards 2 and 4 are installed. If the voltage is 2.92 V, cards 3 and 4 are installed. If the voltage is 0.65V, cards 1, 2, and 3 are installed. If the voltage is 1.48 V, cards 2, 3, and 4 are installed. And, if the voltage is 0.59 V, cards 1, 2, 3, and 4 are installed.

The present invention provides a straightforward approach to increasing the control information available from a single GPIO. With the simple addition of parallel arrangement of resistors in a resistor network and efficient utilization of an unused A/D already present in the system, multiple states can be detected via the single GPIO. In this manner, an effective improvement to performance results.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for increasing control information from a single general purpose input/output (GPIO) mechanism having only two states, the method comprising:

establishing on a single line a voltage level signal from a plurality of voltage levels by utilizing a resistor network coupled via the single signal line to the GPIO to indicate a plurality of states for association with installed options on a computer system planar; and determining which of the installed options is present via the single GPIO.

2. The method of claim 1 wherein determining further comprises utilizing an analog-to-digital (A/D) converter with the GPIO for converting a voltage signal from the GPIO, wherein an output level of the A/D converter represents one of the plurality of states.

3. The method of claim 2 wherein determining further comprises reading the output level of the A/D by a POST (power-on self-test) routine.

4. The method of claim 2 wherein utilizing an A/D converter further comprises utilizing an unused A/D converter in the computer system.

5. The method of claim 4 further comprising utilizing an unused A/D converter of an environmental monitoring chip of the computer system.

6. The method of claim 1 wherein determining a plurality of states further comprises determining how many options are installed in the computer system.

7. The method of claim 1 wherein establishing a plurality of voltage levels utilizing a resistor network further comprises utilizing a plurality of parallel resistors.

8. A system for increasing control information from a single general purpose input/output (GPIO) mechanism, the system comprising:

a computer system planar;

a single GPIO means having only two states coupled to the computer system planar;

a resistor network coupled to the computer system planar and the single GPIO means via a single signal line, the resistor network establishing a voltage level signal on the single signal line for indicating installed options on the computer system planar; and an analog-to-digital (A/D) converter coupled to the single GPIO means, the A/D converter converting the voltage level signal from the single GPIO means to indicate the installed options on the computer system planar.

9. The system of claim 8 further comprising a controller coupled to the computer system planar to perform a POST routine and detect an output signal from the A/D converter.

10. The system of claim 9 wherein the A/D converter further comprises an unused A/D converter of an environmental monitoring chip coupled to the computer system planar.

11. The system of claim 9 wherein the output signal represents one of a plurality of states.

12. The system of claim 11 wherein each of the plurality of states represents presence of one of the installed options.

13. The system of claim 12 wherein the resistor network comprises a plurality of resistors in parallel.

14. A method to allow determination of a plurality of states from a single signal line, the method comprising:

providing a single GPIO (general purpose input/output) mechanism having only two states on a computer system planar to detect status of at least one socket on the computer system planar; and utilizing a resistor network on a single signal line to the single GPIO mechanism to provide on the signal line a voltage signal level indicative of a plurality of states for use in detecting which options are installed on the computer system planar.

15. The method of claim 14 wherein utilizing a resistor network further comprises providing a plurality of resistors in parallel.

16. The method of claim 15 further comprising utilizing an unused A/D converter of an environmental monitoring chip of the computer system planar to convert the voltage signal level.

17. The method of claim 16 further comprising detecting the plurality of states during a POST (power-on self test) routine.

* * * * *